United States Patent

Crane

[15] 3,690,343
[45] Sept. 12, 1972

[54] CIRCULAR IRRIGATION SYSTEM WITH HYDRAULIC DRIVE

[72] Inventor: Elmer Earl Crane, Rt. 1, Box 16, Springfield, Colo. 81073

[22] Filed: June 11, 1971

[21] Appl. No.: 152,159

[52] U.S. Cl..............................137/344, 239/213
[51] Int. Cl...........................B05b 9/02, E01h 3/02
[58] Field of Search...........239/212, 213, 183, 181; 137/81.5

[56] References Cited

UNITED STATES PATENTS

| | | | |
|---|---|---|---|
| 738,271 | 9/1903 | Astle | 239/243 X |
| 1,346,843 | 7/1920 | Ramen | 239/213 |
| 2,896,858 | 7/1959 | Price | 239/212 |
| 2,896,859 | 7/1959 | Price | 239/213 |
| 3,255,968 | 6/1966 | Stafford | 239/212 |
| 3,379,378 | 4/1968 | Kern | 239/212 |
| 3,386,661 | 6/1968 | Olson et al. | 137/344 X |
| 3,448,927 | 6/1969 | Blair | 239/212 X |
| 3,562,994 | 2/1971 | Von Linsome | 239/212 X |
| 3,587,763 | 6/1971 | Kinkead | 137/344 X |
| 3,623,662 | 11/1971 | Reinke | 239/213 X |

Primary Examiner—Samuel Scott
Attorney—Clarence A. O'Brien and Harvey B. Jacobson

[57] ABSTRACT

An elongated irrigation pipe movable in a circular path about a stationary central supply pipe and being supported by a plurality of wheeled towers each being individually driven by a hydraulic motor of the orbit or piston and cylinder type and being supplied with pressurized hydraulic fluid through a hydraulic system independent of the irrigation system and which utilizes tension elements of a truss structure supporting the irrigation pipe for circulation of pressurized hydraulic fluid. A two-way valve is connected in the hydraulic circuit at each tower for controlling the operating speed of each tower in response to misalignment of one irrigation pipe section in relation to an adjacent irrigation pipe section.

10 Claims, 8 Drawing Figures

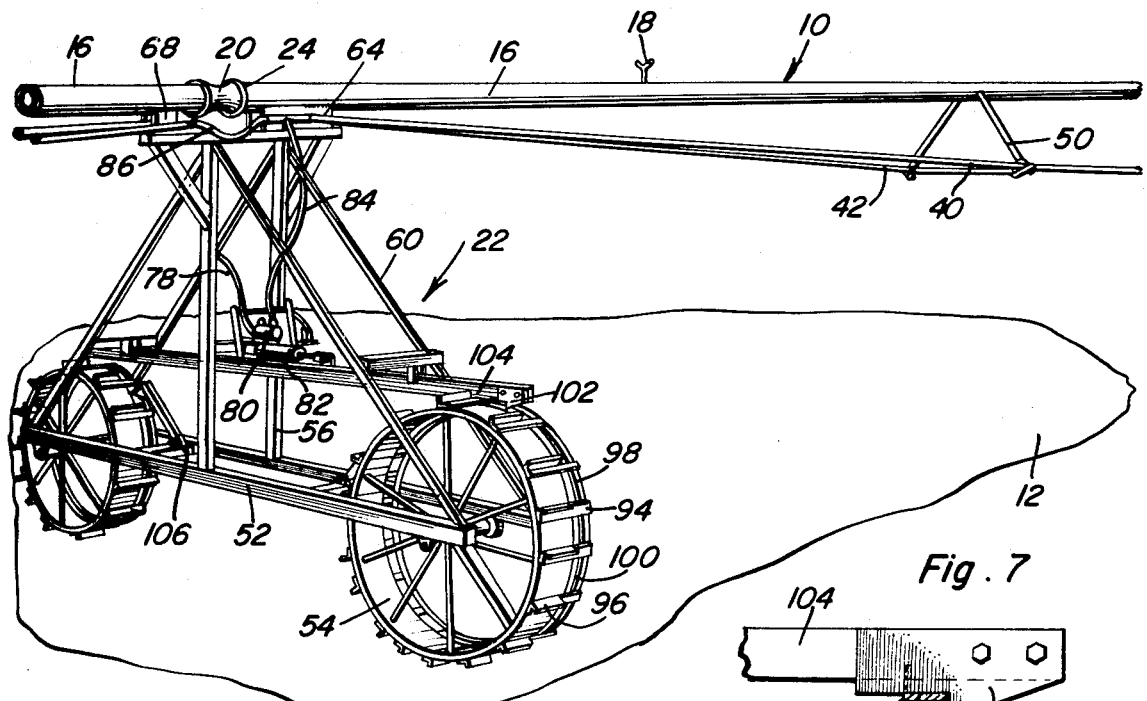

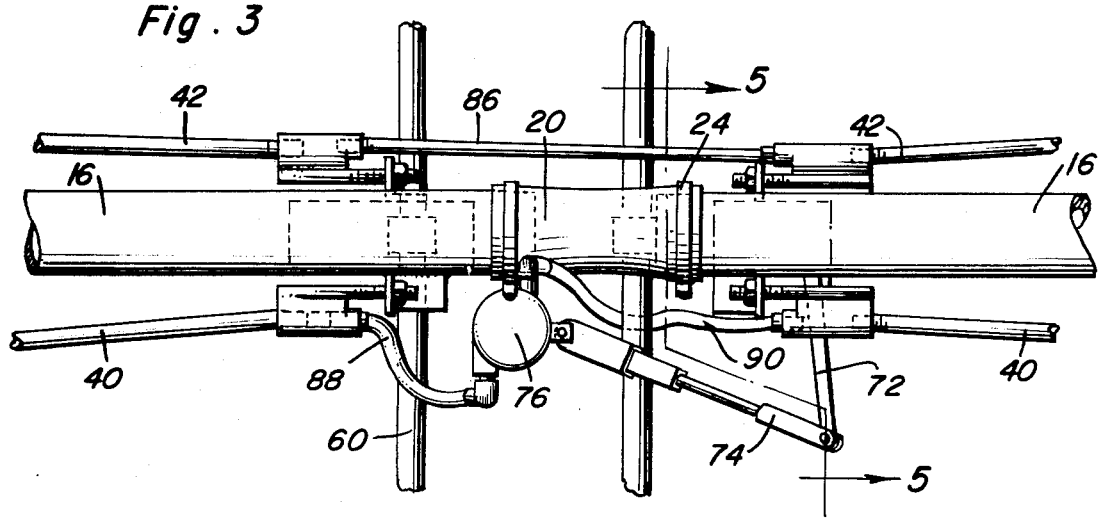
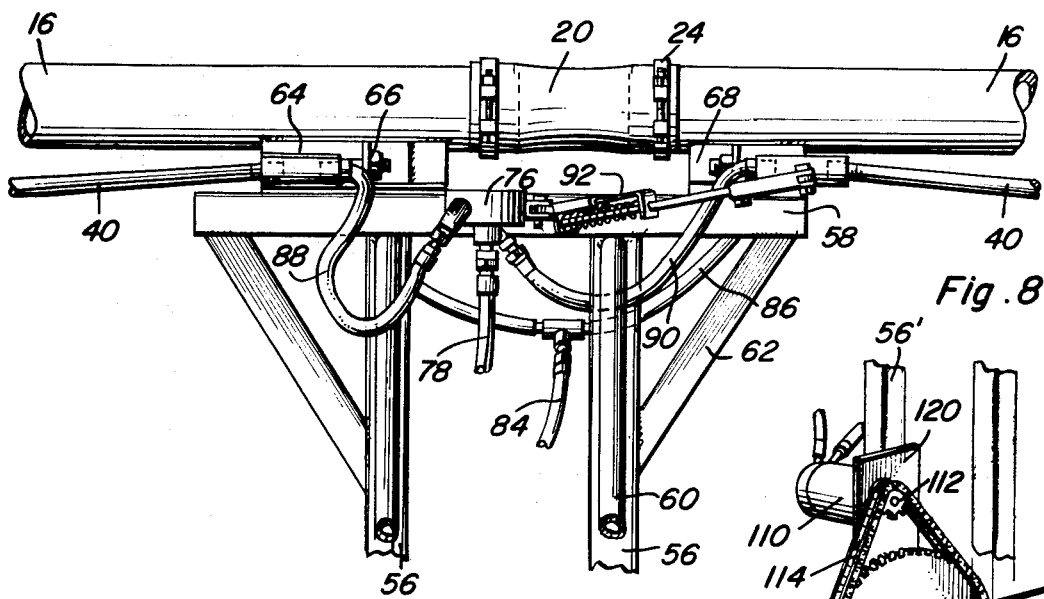
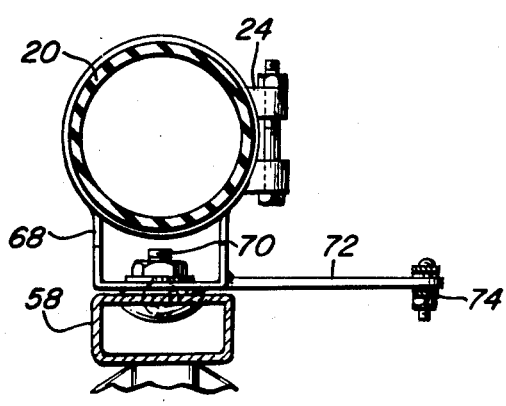

CIRCULAR IRRIGATION SYSTEM WITH HYDRAULIC DRIVE

The present invention generally relates to an irrigation system of the type in which an elongated irrigation pipe having a plurality of sprinkler heads thereon is moved in a circular path by the use of a plurality of independently driven supporting assemblies or towers.

Circular pipe irrigation systems are known where wheeled supporting assemblies or towers are driven by the pressure of the irrigation water in some instances, by electric motors in other instances and mechanical driving mechanisms in other instances all of which operate to propel an elongated irrigation pipe in a circular pattern about a central standpipe. It is an object of the present invention to provide a circular irrigation system in which each individual wheeled tower is individually driven by a standard hydraulic piston and cylinder assembly causing a drive bar to reciprocate for ratchet driving the wheels on a wheeled tower with the hydraulic piston and cylinder assembly being driven from a source of pressurized hydraulic fluid independent of and separate from the irrigation water.

Another object of the invention is to provide an irrigation system in which the irrigation pipe is supported by a truss-assembly disposed in underlying relation to the irrigation pipe and including hollow tension members along the lower edges thereof with the hollow tension members being interconnected in a manner to provide a hydraulic oil circuit for the hydraulic fluid employed to drive the towers.

A further object of the invention is to provide an irrigation system in accordance with the preceding objects in which the hydraulic fluid is passed through a heat exchange device to heat the hydraulic fluid sufficiently to prevent freezing of water on the supporting truss of the irrigation pipe which sometimes occurs when irrigation water is discharged during periods in which the temperature is approaching the freezing point of water.

Still another object of the present invention is to provide an irrigation system in which the irrigation pipe is constructed of sections interconnected by a flexible connector in the form of a flexible tube or coupling to enable articulate movement of one section of the irrigation pipe in relation to the other together with a control apparatus including a two-way valve and a control arm associated therewith which actuates the two-way valve in response to relative pivotal movement of one irrigation pipe section in relation to the other for controlling flow of hydraulic fluid to the hydraulic piston and cylinder assemblies for driving each wheeled tower.

A still further object of the invention is to provide an irrigation system in which the reciprocating drive bar is provided with a drive engagement with a relatively wide supporting wheel having lugs thereon oriented in alignment with openings in the wheel to enable the driving lug on the drive bar to effectively engage with the wheel even during muddy conditions.

Yet another object of the present invention is to provide an irrigation system which has a minimum number of parts for proper operation, is simple and dependable in operation and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of one of the supporting towers and a pair of adjacent irrigation pipe sections illustrating the relationship of the components.

FIG. 2 is a perspective view of the standpipe assembly illustrating the hydraulic oil system for driving the wheeled towers.

FIG. 3 is a top plan view of the coupling, to a valve and control therefor.

FIG. 4 is a side elevational view of the construction of FIG. 3.

FIG. 5 is a transverse, sectional view taken substantially upon a plane passing along section line 5—5 of FIG. 3 illustrating the structure of the flexible coupling and the pivotal connection of one section of the irrigation pipe with the supporting tower.

FIG. 6 is a detailed plan view of a portion of a drive wheel and the reciprocating drive bar.

FIG. 7 is a detailed sectional view taken substantially upon a plane passing along section line 7—7 in FIG. 6 illustrating further structural details of the drive bar and wheel.

FIG. 8 is a fragmental perspective view of another type drive unit for the drive bar.

Referring now specifically to the drawings, the numeral 10 generally designates an irrigation pipe supported for movement in a circular path in overlying relation to an area 12 to be irrigated with the inner end of the pipe 10 being connected with a standpipe assembly generally designated by the numeral 14. The irrigation pipe 10 includes a plurality of sections 16 each of which is provided with sprinkler heads 18 of conventional construction. The pipe sections 16 are interconnected by a flexible coupling 20 with the adjacent ends of adjacent sections being supported by wheeled tower assemblies 22 each of which are individually driven and which support and propel the irrigation pipe 10 in its circular path.

The coupling 20 is in the form of a short section of flexible tubing of rubber-like material or flexible metal material or the like secured to the adjacent ends of adjacent irrigation sections 16 by conventional split clamp assemblies 24 as illustrated in FIG. 5 thus enabling adjacent sections 16 of the irrigation pipe 10 to pivot universally in relation to each other without bending the pipe inasmuch as the flexible coupling 20 or flexible tube provides an articulate connection between the irrigation pipe sections 16.

The standpipe assembly includes a supply pipe 26 which is connected with a suitable source of supply such as a well, pump or the like and extends vertically to the center of a supporting stand 28 where it rotatably connects to and communicates with the irrigation pipe 10 in a manner well-known. The stand 28 is supported on a suitable platform or the like 30 which may be of a permanent or temporary nature as desired.

Mounted on the platform 30 is an internal combustion engine assembly 32 driving a hydraulic fluid pressure pump 34 communicated with a hydraulic oil reservoir 36 and which circulates hydraulic fluid pressure through hoses 38 which are connected to tubular members 40 and 42 which form tension members of a truss-assembly which support each pipe section 16. The reservoir 36 is provided with a heating coil 44 therein which is communicated with the cooling system of the internal combustion engine 32 through hoses 46 so that water heated by the internal combustion engine and which is normally cooled by the radiator associated therewith is first passed through the heating coil 44 which may be in the form of a spirally wound copper tube or the like and then returned to the engine or radiator therefor so that the hydraulic oil in the reservoir 36 will be heated thus forming a heat exchanger assembly for heating the hydraulic oil circulated through the conduits 40 and 42. The hydraulic oil is connected to the conduits 40 and 42 by any suitable quick-coupling arrangement 48 or may be connected thereto by a rotary joint to enable conveyance of fluid pressure during rotation of the irrigation pipe 10. The rotary joint may be of conventional construction and does not form any particular part of the invention with the purpose of the heat exchanger being to raise the temperature of the oil circulated through the hydraulic system during periods of cold weather thus preventing the formation of ice on the truss members.

The conduits 40 and 42 are in the form of tubular pipes which diverge from each other and are rigidly supported from downwardly opening clevises on the lower end of a pair of downwardly diverging brace members 50 which are rigid with the pipe sections 16 and diverge downwardly therefrom with the lower ends thereof rigidly interconnected by a cross member. The ends of the pipes or conduits 40 and 42 are rigidly fixed to the pipe sections 16 at the ends thereof.

Each of the supporting assemblies or wheeled towers 22 includes a horizontally disposed frame 52 rotatably journaling a spoked wheel 52 at each end thereof. The frame 52 includes upstanding frame members 56 at the center thereof which are interconnected by a top member 58 extending longitudinally of the irrigation pipe and bridging the coupling 20. The upstanding frame members 56 are braced by forwardly and rearwardly inclined braces 60 which extend to the ends of the horizontal frame 52 and the top member 58 is braced by inclined braces 62 and thus providing a rigid structure for supporting the irrigation pipe.

The outer end of an inner section of irrigation pipe is supported from the top member 58 by a bracket 64 with the pipe conduits 40 and 42 being connected thereto as at 66. The inner end of the outboard pipe section 16 is provided with a bracket 68 on the lower surface thereof which has the conduits 42 connected thereto and which is universally pivotally attached to the top member 58 by a pivot bolt 70 and a ball and socket type connection which enables pivotal movement of the pipe section 16 and articulate movement of the pipe sections about substantially a vertical axis and about substantially a horizontal axis to enable limited universal movement thereof.

As illustrated in FIG. 5, the bracket 68 is provided with a rigid laterally extending arm 72 which has a control rod 74 pivotally connected to the outer end thereof. The control rod 74 has its other end pivotally connected to a two-way control valve 76 which bypasses fluid from the conduit 40 into a downwardly extending hose 78 which is communicated with a valve assembly 80 mounted on a hydraulic piston and cylinder assembly 82. Hydraulic fluid pressure returns from the valve assembly 80 through a return hose 84 which is connected into a connecting hose 86 which extends between adjacent ends of the conduit 42. The valve 76 is communicated with the conduits 40 by hoses 88 and 90. The conduits 40 and 42 are connected to the brackets 64 and 68 respectively and the hoses 86, 88 and 90 provide for relative movement between the pipe sections with the hydraulic oil normally passing out through the conduit 40, through the hose 88, through the two-way valve 76 without being diverted, thus through the hose 90 and further through the conduit 40. The conduits 40 and 42 are interconnected at the outer end of the irrigation pipe and return flow occurs through the pipe 42 and through the hose 86 and thence further along pipe 42. When the pipe sections 16 become misaligned to a predetermined degree, the arm 72 will actuate the rod 74 thus actuating the two-way valve 76 for diverting a portion of the hydraulic fluid flow down through the hose 78, through the valve 80, hydraulic piston and cylinder assembly, back through the valve 80 and back into the return hose 86 through the hose 84. If the angle between the pipe sections exceeds a predetermined angle, movement of the arm 72 and actuating rod 74 will cause movement of the valve 76 to restrict its flow in such a manner to build-up the pressure in the hydraulic oil control line so that such excessive pressure will de-activate the hydraulic drive system. This will stop the irrigation system and prevent breakage or damage thereto until the cause of misalignment has been corrected.

The two-way valve 76 is of any conventional construction and the rod 74 is preferably adjustable in length and provided with a spring-loaded telescopic connection 92 therein which prevents breakage of the components when the angulation between adjacent pipe sections 16 exceeds a predetermined maximum.

Each wheel 54 includes a plurality of transversely extending strap members 94 having radially extending flanges 96 rigid with one edge thereof with the flanges 96 defining lugs to prevent slippage between the wheels 54 and the surface 12 on which they rest. The straps 94 extend beyond one edge of the wheel 54 which has a peripheral member 98 rigidly attached thereto in axial spaced relation and coextensive with the wheel 54 to define a peripheral slot 100 therebetween with the straps 94 defining transverse elements extending across the slot 100 to define driving lugs which are engageable by a projecting ratchet member 102 mounted at each end of a reciprocatory drive bar 104 as illustrated in FIG. 11 with one ratchet member being in the form of a hook for exerting a pulling force and the other being in the form of an abutment to exert a push. Both rachet members will have a cam approach surface to ride over the lugs on the return stroke. Any mud tending to clog to the lugs will be pushed through the slot 100 by the ratchet member 102 as illustrated in FIG. 7.

Attached to the frame 52 is a pair of gravity operated stop members 106 which are shaped like the ratchet drive members 102 and serve to prevent rotation of the wheels in reverse direction thus being effective to prevent the wheels from rolling in a reverse direction during reciprocation of the drive bar 104 when propelling the tower 22 upgrade.

The two-way control valve or selector valve 76 permits the hydraulic oil to go straight through until the arm 72 and control rod 74 are moved to indicate misalignment of the pipe sections. At that point, a portion of the oil goes to the drive piston and cylinder assembly 80 through the control valve 78. If the tower gets too far behind or too far ahead, the valve 76 will block off the hydraulic flow line thus building up pressure actuating a safety pressure switch which will shut off the internal combustion engine 32 thus preventing damage to the irrigation system. With this arrangement, the tension members 40 and 42 of the truss which support the main water line is also used as the hydraulic pressure and return line for the hydraulic oil system which thus enables one structure to serve both the supporting function and the fluid conduit function thereby reducing the cost of the system.

By running the hydraulic oil through a heat exchanger from the power unit, it helps to keep the lines free from ice when irrigating during periods of low temperatures which is necessary in connection with certain crops under certain conditions. This structure also eliminates overhead cables and wires which materially simplifies the construction. In this arrangement, the main water line is not flexed or bent inasmuch as each tower has a pivotal connection with one of the irrigation pipe sections, and the pipe sections are interconnected with a flexible coupling. The power unit 82 on each tower is a standard 8-inch stroke hydraulic piston and cylinder assembly and to obtain a push and pull action on the drive wheel 54, a four-way valve 80 is used and connected by a toggle switch which is controlled by the push and pull bar 104. The wide wheel 54 combined with the member 98 which in effect forms an extension thereof provides additional support and also provides drive opening cut-outs or slots 100 which provides for more traction and assures proper engagement of the push and pull bar 104 with the drive wheels.

FIG. 7 illustrates an alternative drive arrangement for the reciprocating drive bar 104 which includes an orbit type hydraulic motor 110 having a sprocket output gear 112 driving a sprocket chain 114 that engages an enlarged plate type sprocket gear 116. Eccentrically attached to the gear 116 is connecting rod 118 that is pivotally connected to the drive bar 104 for reciprocation thereof as the gear 116 is rotated. The motor 110 and associated gears 112 are supported from a suitable plate 120 mounted on frame member 56 in any suitable manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An irrigation system comprising an elongated irrigation pipe divided into at least two sections articulately interconnected, driven support means engaging said pipe at the interconnection between the sections thereof, means responsive to angulation of adjacent sections to drivingly actuate the support means for retaining the adjacent sections in alignment, truss means on each section of pipe and including tension members, said tension members constituting means conveying drive force to the supporting means for driving the same thereby enabling the tension members of the truss to serve as supports for the pipe and means conveying driving force to the support means.

2. The structure as defined in claim 1 wherein the supporting means includes hydraulic drive means, said tension members being in the form of pipes conveying hydraulic drive fluid to the hydraulic drive means on the support means.

3. The structure as defined in claim 2 together with a heat exchanger associated with the hydraulic fluid to heat the fluid to prevent formation of ice on the truss components through which the warm hydraulic fluid circulates.

4. The structure as defined in claim 3 wherein said heat exchanger includes a tubular coil in heat exchange relation to the drive fluid, an internal combustion engine having coolant circulated through the coil to heat the drive fluid, and pump means driven by said engine to pressurize and circulate the drive fluid.

5. The structure as defined in claim 1 wherein each support means includes a wheel having a plurality of transverse lugs thereon, and a reciprocating push-pull bar disposed tangentially above the wheel, said wheel including peripherally spaced openings therein defining transversely extending driving lugs therebetween, and a ratchet member carried by the push-pull bar to engage the drive lugs with the openings preventing the wheel from becoming clogged with mud.

6. The structure as defined in claim 5 together with a gravity operated stop member engaging the transverse lugs on the wheel to prevent reverse rotation of the wheel when the ratchet member is moving away from the lug just propelled.

7. The structure as defined in claim 1 wherein said supporting means includes a ground engaging means and a hydraulic piston and cylinder assembly driving said ground engaging means, a hydraulic fluid pressure conduit communicated therewith through a selector valve, and means interconnecting the selector valve and one of the pipe sections to actuate the selector valve in response to angulation of the pipe sections in relation to each other to vary the characteristics of the selector valve and the characteristics of hydraulic flow to the piston and cylinder assembly in response to variation in angulation between the irrigation pipe sections.

8. The structure as defined in claim 7 wherein said ground engaging means includes a wheel having a plurality of transverse lugs thereon, and a reciprocating push-pull bar disposed tangentially above the wheel, said wheel including peripherally spaced openings therein defining transversely extending driving lugs therebetween, and a ratchet member carried by the push-pull bar to engage the drive lugs with the openings preventing the wheel from becoming clogged with mud.

9. The structure as defined in claim 1 wherein said supporting means includes a ground engaging means and an orbit hydraulic fluid pressure conduit means communicated with the motor through a control valve, and means interconnecting one of the pipe sections and the control valve for varying the hydraulic fluid flow to the motor thereby varying the speed of ground engaging means in response to variation in angulation between the pipe sections.

10. The structure as defined in claim 9 wherein said ground engaging means includes a wheel having a plurality of transverse lugs thereon, and a reciprocating push-pull bar disposed tangentially above the wheel, said wheel including peripherally spaced openings therein defining transversely extending driving lugs therebetween, and a ratchet member carried by the push-pull bar to engage the drive lugs with the openings preventing the wheel from becoming clogged with mud.

* * * * *